US010844521B2

(12) United States Patent
Korzhenko et al.

(10) Patent No.: US 10,844,521 B2
(45) Date of Patent: *Nov. 24, 2020

(54) PROCESS FOR PRODUCING CARBON FIBRES FROM BIOSOURCED PRECURSORS AND THE CARBON FIBRES OBTAINED (71) Applicant: Arkema France, Colombes (FR)

(72) Inventors: Alexander Korzhenko, Pau (FR); Tatiana Kolomiets, Saratov Balakovo (RU)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/344,956

(22) PCT Filed: Oct. 26, 2017

(86) PCT No.: PCT/FR2017/052952
§ 371 (c)(1),
(2) Date: Apr. 25, 2019

(87) PCT Pub. No.: WO2018/078288
PCT Pub. Date: May 3, 2018

(65) Prior Publication Data
US 2019/0271101 A1    Sep. 5, 2019

(30) Foreign Application Priority Data
Oct. 28, 2016    (FR) ..................... 16 60540

(51) Int. Cl.
| C08K 3/04 | (2006.01) |
| D01F 9/17 | (2006.01) |
| C01B 32/05 | (2017.01) |
| C08K 7/06 | (2006.01) |
| C08K 9/06 | (2006.01) |
| D01F 9/16 | (2006.01) |
| C04B 35/632 | (2006.01) |
| C04B 35/52 | (2006.01) |
| C04B 35/83 | (2006.01) |

(52) U.S. Cl.
CPC ................ *D01F 9/17* (2013.01); *C01B 32/05* (2017.08); *C04B 35/522* (2013.01); *C04B 35/632* (2013.01); *C04B 35/83* (2013.01); *C08K 3/04* (2013.01); *C08K 7/06* (2013.01); *C08K 9/06* (2013.01); *D01F 9/16* (2013.01); *C01P 2004/03* (2013.01); *C04B 2235/3201* (2013.01); *C04B 2235/444* (2013.01); *C04B 2235/447* (2013.01); *C04B 2235/449* (2013.01); *C04B 2235/483* (2013.01); *C04B 2235/5252* (2013.01); *C04B 2235/5264* (2013.01); *C04B 2235/5288* (2013.01); *C04B 2235/616* (2013.01); *C04B 2235/6567* (2013.01); *C04B 2235/6585* (2013.01); *C04B 2235/66* (2013.01)

(58) Field of Classification Search
CPC .... C08K 3/04; C08K 9/06; C08K 7/06; D01F 9/17; C01B 32/05; C01P 2004/03; C04B 35/522; C04B 35/83; C04B 35/632
USPC ......................................... 523/222
See application file for complete search history.

(56) References Cited

U.S. PATENT DOCUMENTS

| 6,720,057 | B1 * | 4/2004 | Neumayr ............. A61K 8/0208 |
| | | | 264/186 |
| 7,824,651 | B2 | 11/2010 | Zhamu et al. |
| 9,909,235 | B2 * | 3/2018 | Korzhenko ............ D06M 11/74 |
| 2004/0234445 | A1 | 11/2004 | Serp et al. |
| 2007/0087120 | A1 | 4/2007 | Connors et al. |
| 2009/0121380 | A1 | 5/2009 | Olry et al. |
| 2011/0285049 | A1 | 11/2011 | Baker et al. |
| 2013/0087552 | A1 | 4/2013 | Lee et al. |
| 2014/0065909 | A1 | 3/2014 | Lee et al. |
| 2015/0292118 | A1 | 10/2015 | Korzhenko et al. |
| 2016/0122515 | A1 | 5/2016 | Karampelas |
| 2019/0270678 | A1 * | 9/2019 | Korzhenko ......... C04B 38/0022 |

FOREIGN PATENT DOCUMENTS

| CN | 1587457 A | 3/2005 |
| FR | 2994968 A1 | 3/2014 |
| FR | 2997097 A1 | 4/2014 |
| KR | 20120082287 A | 7/2012 |
| WO | 03002456 A2 | 1/2003 |
| WO | 2014064373 A1 | 5/2014 |

OTHER PUBLICATIONS

International Search Report (PCT/ISA/210) dated Dec. 7, 2017, by the European Patent Office as the International Searching Authority for International Application No. PCT/FR2017/052952.
International Search Report (PCT/ISA/210) dated Feb. 9, 2018, by the European Patent Office as the International Searching Authority for International Application No. PCT/FR2017/052949.

(Continued)

Primary Examiner — Hannah J Pak
(74) Attorney, Agent, or Firm — Buchanan Ingersoll & Rooney P.C.

(57) ABSTRACT

A process for producing a highly carbonaceous fibre or set of fibres including combining a structured precursor comprising a hydrocellulose fibre or a set of fibres, and an unstructured precursor, including lignin or a lignin derivative in the form of a solution having a viscosity less than 15,000 mPa·s$^{-1}$ at the temperature at which the combination step takes place, in order to obtain a hydrocellulose fibre or set of fibres coated with the lignin or lignin derivative, wherein the process further includes a step of thermal and dimensional stabilization of the hydrocellulose fibre or set of fibres covered with the lignin in order to obtain a hydrocellulose fibre or set of fibres covered with a deposit of lignin or lignin derivative, and a carbonization step of the hydrocellulose fibre or set of fibres coated with a lignin deposit in order to obtain a highly carbonaceous fibre or set of fibres.

17 Claims, 2 Drawing Sheets

(56) References Cited

OTHER PUBLICATIONS

Written Opinion (PCT/ISA/237) dated Dec. 7, 2017, by the European Patent Office as the International Searching Authority for International Application No. PCT/FR2017/052952.
Written Opinion (PCT/ISA/237) dated Feb. 9, 2018, by the European Patent Office as the International Searching Authority for International Application No. PCT/FR2017/052949.

* cited by examiner

PROCESS FOR PRODUCING CARBON FIBRES FROM BIOSOURCED PRECURSORS AND THE CARBON FIBRES OBTAINED

The invention relates to the field of carbon fibres, and more particularly to carbon fibres produced from biosourced precursors, for the production of parts made of thermoplastic or thermosetting composite materials, which may be used, in particular, in the field of aeronautics, automotive, wind energy, naval, building construction, sports. The invention relates to a process of producing a highly carbonaceous fibre or set of highly carbonaceous fibres and the fibre or set of fibres obtainable by such a production process.

BACKGROUND

The carbon fibre market is booming. In recent years, the carbon fibre industry has grown steadily to meet the demands of various applications. The market is currently estimated at around 60 kt/y and is expected to grow to 150-200 kt/y by 2020-2025. This strong forecast growth is mainly related to the introduction of carbon fibre in composite materials used in the aerospace, energy, building, automotive and leisure sectors.

Carbon fibres generally have excellent tensile properties, high thermal and chemical stability, good thermal and electrical conductivities, and excellent resistance to deformation. They may be used as reinforcements for composite materials which usually comprise a polymer resin (matrix). The composite materials thus reinforced exhibit excellent physical properties while maintaining an advantageous lightness. Increased lightness is one of the key measures for reducing $CO_2$ emissions for transport. The automotive and aerospace industry is demanding compounds presenting, with equivalent performance, a greater lightness.

In this context, automotive and aeronautical industries, and more broadly industry as a whole, also need high-performance materials but at contained costs. In fact, the performance of composite materials is partly related to the use of carbon reinforcing fibres which present, today, the disadvantage of high prices resulting from the raw material used and the production processes.

Today, carbon fibres are mainly made from acrylic precursors. Polyacrylonitrile (PAN) is the most widely used precursor today for the production of carbon fibres. In brief, the production of carbon fibres from PAN comprises the polymerization steps of PAN-based precursors, fibre spinning, thermal stabilization, carbonization and graphitization. The carbonization takes place under a nitrogen atmosphere at a temperature of 1000 to 1500° C. The carbon fibres obtained at the end of these steps comprises 90% carbon, about 8% nitrogen, 1% oxygen and less than 1% hydrogen. An additional step, designated as graphitization, is sometimes performed. This step generally requires a temperature of 2500 to 3000° C. In this case, the final step is to obtain a material composed of 99% carbon, which makes it considerably more malleable, but also less resistant. These two steps of carbonization and graphitization require very high temperatures and are therefore energy-consuming. The blocking factors for a wider use of composite materials based on carbon fibres having PAN fibres as a precursor, are their cost, which is partly related to the cost of oil and the management of the production line, in particular the rise in temperature, which is quite complex.

Pitch precursors have also been developed but, like acrylic precursors, they consume fossil resources and lead to energy consumption related to the high temperatures required during the carbonization and graphitization steps.

With the objective of reducing the price of carbon fibre, one of the proposed solutions has been to replace its basic elements derived from petroleum (for example: PAN or pitch) with biobased materials, such as cellulose or cellulose. lignin, contained in wood. The cost price for the production of carbon fibre using cellulose as the precursor is much lower than that of fibres with PAN. In this regard, several cellulosic precursors have been evaluated. Cellulose-based precursors have the advantage of producing well-structured carbon structures, but generally fail to achieve satisfactory carbon yields.

However, there are more environmentally friendly fibre production processes in the prior art. For example, the application WO2014064373 published on 1 May 2014 as filed by the Applicant describes a process for the continuous production of carbon fibre doped with carbon nanotubes (CNT) from a biosourced precursor, The presence of CNT in the biosourced precursor makes it possible to increase the carbon yield of the precursor during carbonization, and also to increase the mechanical characteristics of the carbon fibres. The biosourced precursor may be cellulose transformed in the form of fibres by dissolution and coagulation/spinning, in order to form hydrocellulose (such as, for example, viscose, lyocell, rayon). Such a process enables the production of a continuous and regular filament from the biosourced precursor. Nevertheless, this method is still based on a carbonization step with a temperature rise up to 600° C. and a graphitization step at a temperature of 2000° C. to 3000° C., preferably 2200° C., resulting in a corresponding consumption of energy related to the high temperatures required.

It is also possible to refer to the document KR 20120082287 which describes a process for producing carbon fibre from a precursor material comprising lyocell (cellulosic fibres from wood or bamboo) and a nanocomposite material—graphenes.

Reference may also be made to CN1587457 which describes a process for preparing a cellulosic precursor material for the production of carbon fibre offering improved properties and a lower cost of production. The cellulosic preparation involves inserting the soot nanoparticles into the cellulosic solution.

Similarly, US 2011/285049 describes a process of producing a carbon fibre from a precursor material comprising a continuous lignin fibre comprising dispersed carbon nanotubes representing 10% by weight or less, and preferably from 0.5 to 1.5%. The lignin and the carbon nanotubes are mixed and heated to the melted state for extrusion and spinning. This process does not provide a step of sizing of the precursor material.

However, the processes as described above all rely on the use of a precursor based on cellulose or lignin which is added to the fillers before implementing the steps of carbonization and graphitization. These processes are unsatisfactory when one seeks to increase carbon yields and/or lighten the composite material parts made with these carbon fibres. In addition, the carbonization and graphitization steps are carried out at usual temperatures which remain too high to be able to achieve a reduction in the production costs of the fibres or sets of fibres, and the composite material parts produced with these fibres.

Thus, there is still a need for precursors and processes for producing carbon fibres capable of responding to the problems encountered with existing methods and allowing: i) reduced density to produce fibre-based lighter carbon materials; ii) high carbon yield, iii) reduced production costs, and iv) easy carbon fibre conversion.

Technical Problem

The invention therefore aims to overcome the drawbacks of the prior art. In particular, the invention aims to provide a carbon fibre production process wherein the process should be simple to implement, with a reduced number of steps, and to contain costs in particular through the reduction of energy expenses related to the steps of carbonization and graphitization.

The invention further aims to provide a highly carbonaceous fibre or a set of highly carbonaceous fibres, which are very mechanically stable and offer a higher carbon yield than is the case with carbon fibres conventionally obtained from biosourced materials. In addition, the highly carbonaceous fibres according to the invention are light and have a density lower than conventional carbon fibres. Advantageously, the process may be carried out on organized and non-carbonized sets of fibres, for example Lyocell, viscose, rayon, in order to form sets of carbon fibres woven into carbon fibre fabrics, rapidly and at low cost.

BRIEF DESCRIPTION OF THE INVENTION

Thus, the invention relates to a process for producing a highly carbonaceous fibre or a set of highly carbonaceous fibres, mainly characterized in that this comprises the combination of a structured precursor comprising a hydrocellulose fibre or a set of hydrocellulose fibres, and an unstructured precursor comprising lignin or a lignin derivative in the form of a solution having a viscosity less than 15,000 mPa·s$^{-1}$ and preferably less than 10,000 mPa·s$^{-1}$ at the temperature at which the combination step takes place, in order to obtain a hydrocellulose fibre or set of hydrocellulose fibres coated with the lignin, wherein the process further comprises the steps of:
  a step of thermal and dimensional stabilization of the hydrocellulose fibre or set of fibres covered with the lignin, in order to obtain a hydrocellulose fibre or set of fibres covered with a lignin deposit, and
  a step of carbonization of the hydrocellulose fibre or set of fibres covered with a lignin deposit, in order to obtain a highly carbonaceous fibre or set of fibres.

This new production process of producing, based on biosourced precursors, a highly carbonaceous carbon fibre or a set of highly carbonaceous carbon fibres has many advantages such as reducing the energy required to produce materials with equivalent properties, obtaining a higher carbon yield than observed with the processes of the prior art, and the formation of fibres having a low density.

According to other optional features of the process:
  the structured precursor comprises a twisted multi-filament, a non-twisted multi-filament, a set of non-woven fibres, or a set of woven fibres. In fact, the process according to the invention has the advantage of reducing the production costs of sets of carbon fibres (for example, woven). For example, in the context of the process according to the invention, it is possible to produce a fabric made of hydrocellulose fibre (for example: viscose, lycell, rayon), and to subject it directly to the production process according to the invention, so as to form a set of highly carbonaceous fibres wherein:
  the unstructured precursor comprises between 1 and 50%, preferably between 5% and 15% by weight of lignin or of a lignin derivative. Lignin is a widely available, underutilized and low-cost resource that allows the process to meet the economic demands of industries. In addition, at such concentrations, the hydrocellulose fibres are completely covered with a deposit of lignin without it causing a deformation of the fibres or an amalgam.
  the unstructured precursor is an aqueous solution, or an organic solution or a mixture of both. These alternatives make it possible to adapt the unstructured precursor according to the lignin or lignin derivative used as well as any added carbon nanotubes. Preferably, the unstructured precursor is a hydroalcoholic solution of lignin or lignin derivative.
  the structured precursor comprises at least one hydrocellulose fibre the diameter of which is between 0.5 µm and 300 µm, preferably between 1 µm and 50 µm. The invention has the advantage that it may be adapted to a wide range of hydrocellulose fibre diameters.
  the structured precursor and/or the unstructured precursor comprises carbon nanotubes, wherein the carbon nanotubes are present at a concentration of between 0.0001% and 10% by weight, preferably between 0.01% and 1% by weight. The addition of carbon nanotubes (CNT) to one or both of the precursors makes it possible to improve the carbon yield of the fibre obtained. In fact, when such a substance is added to the lignin or lignin derivative, the lignin or lignin derivative acts as a binder and results in an increase in the amount of CNT being effectively inserted into the resulting carbon fibre.
  the combination step comprises impregnation. Impregnation has the advantage of being a method that may be easily implemented industrially.
  the combination and thermal and dimensional stabilization steps are repeated one or more times. This is particularly advantageous because it is possible to increase the carbon yield, to increase the diameter of the fibres obtained, and/or to reduce their density.
  the production process further comprises, before the carbonization step, the following steps:
    a sizing step of contacting the fibre or set of lignin-coated hydrocellulose fibres with an aqueous solution comprising at least one flame retardant compound, wherein the flame retardant compound may be selected from: potassium, sodium, phosphate, acetate, chloride, urea, and
    a drying step after the sizing.
  This has the advantage of reinforcing the physicochemical properties of the carbon fibres obtained. In fact, although the lignin or the lignin derivative has flame retardant properties, the addition of a sizing step with a solution comprising at least one flame retardant compound makes it possible to improve the characteristics of the carbon fibre obtained.
  Advantageously, the sizing and post-sizing drying steps are repeated one or more times. This is advantageous because it is possible to increase the amount of flame retardant associated with the fibre or to combine different treatments based on different substances.
  the production process according to the invention further comprises, after the carbonization step, a graphitization step. Graphitization makes it possible to increase the malleability of the carbon fibre or of the set of carbon fibres obtained by the method according to the invention.
  the production process according to the invention further comprises, after the carbonization step, a sizing step of bringing the highly carbonaceous fibre or set of fibres into contact with a solution comprising at least one organic component, which may comprise at least one silane or silane derivative and/or at least one siloxane or siloxane derivative. This step makes it possible to improve the physicochemical properties of the fibre (for example protection against abrasion and to improve the integrity of the fibres) and has the advantage, in the context of the invention, of being able to be carried out on a whole fibre, i.e. for example on a carbon fibre fabric.

The invention also relates to a hydrocellulose fibre or set of fibres covered with a deposit of lignin or lignin derivative as an intermediate product obtained after the thermal and dimensional stabilization step of the production process according to the invention, for which the ratio of the mass of fibre to the mass of lignin or lignin derivative is between 1/2 and 100/1.

Optionally, the deposition of lignin or lignin derivative of the hydrocellulose fibre or set of fibres covered with a lignin or lignin derivative deposit according to the invention may comprise between 0.50% and 50% by weight of flame retardant compound, preferably between 2% and 30% by weight with respect to the lignin deposit).

The invention further relates to a highly carbonaceous fibre or a highly carbonaceous fibre fabric that is obtainable by the method according to the invention. Advantageously, this fibre or this set of fibres has, after the carbonization step, a density of between 0.20 and 1.95 $g/cm^3$, preferably between 1.45 and 1.60 $g/cm^3$. These products meet the expectations of manufacturers looking for lighter carbon fibres that nevertheless offer sufficient mechanical properties, to meet, in particular, the needs of the aerospace or automotive industries.

The invention further relates to the use of fibres or sets of highly carbonaceous fibres obtained according to the production method, for the production of parts made of thermoplastic or thermosetting composite materials.

The invention also relates to thermoplastic or thermosetting composite materials obtained with fibres or sets of fibres produced according to the production method of the invention. These thermoplastic or thermosetting composite materials have the advantage of presenting, for an identical volume, a weight less than 5% by weight of conventional thermoplastic or thermosetting composite materials.

BRIEF DESCRIPTION OF DRAWINGS

Other advantages and features of the invention will become apparent upon reading the following description given by way of an illustrative and non-limiting example, with reference to the appended figures, wherein.

DETAILED DESCRIPTION

The term "highly carbonaceous fibre or set of fibres" according to the invention is understood to mean a material composed of more than 80% by weight of carbon, preferably more than 90%, more preferably more than 95%, even more preferably more than 98% (these materials are considered to be materials of very high purity).

The term "hydrocellulose fibre" according to the invention is understood to mean cellulose or cellulose-derivative fibres, preferably of continuous and regular diameter, that are obtained after dissolution of cellulose from lignocellulosic material. As will be detailed in the rest of the text, this combination may be achieved by several alternative methods. The hydrocellulose may, for example, be obtained after treatment with sodium hydroxide followed by dissolution with carbon disulphide. In this case, the hydrocellulose is more particularly called viscose. Alternatively, the hydrocellulose fibre may be obtained from lignocellulosic material dissolved in a solution comprising N-methylmorpholine N-oxide to form Lyocell.

The term "lignin" according to the invention is understood to mean a plant aromatic polymer whose composition varies with the plant species, and is generally formed from three phenylpropanoid monomers: p-coumaryl, coniferyl and sinapyl alcohols.

The term "lignin derivative" according to the invention is understood to mean a molecule having a lignin-type molecular structure and having substituents added during the lignin extraction method or later, in order to modify its physicochemical properties. There are many processes for extracting lignin from lignocellulosic biomass and these may lead to lignin modifications. For example, the Kraft process uses a strong base with sodium sulphide to separate lignin from cellulose fibres. This process can form thio-lignins. The sulphite process, resulting in the formation of lignosulonates. The organosols pretreatment processes use an organic solvent or mixtures of organic solvents with water to solubilize the lignin prior to the enzymatic hydrolysis of the cellulosic fraction. Preferably, lignin derivative means a lignin having substituents that may be selected from: thiol, sulphonate, alkyl, or polyester. The lignins or lignin derivatives used in the context of the present invention generally have a molecular weight greater than 1000 g/mol, for example greater than 10,000 g/mol.

In the following description, the same references are used to designate the same elements.

Figure 1:
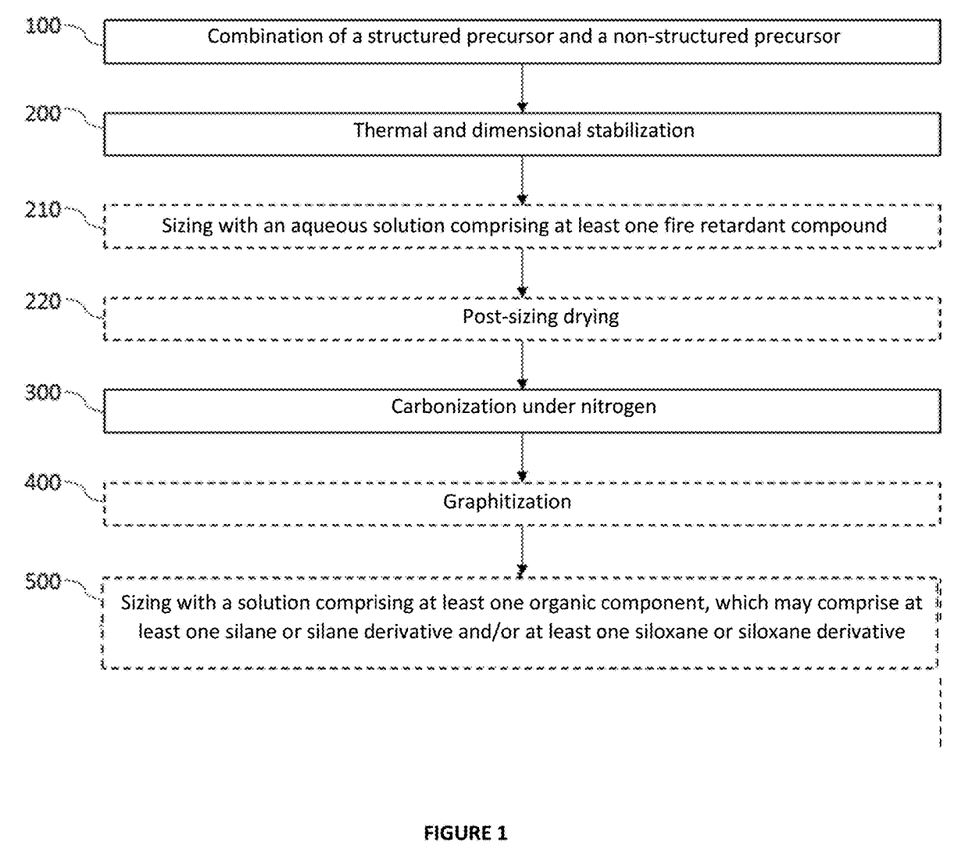
FIG. 1 shows a diagram of an embodiment of the carbon fibre production process according to the invention. Steps framed by dots are optional.

According to a first aspect, the invention relates to a method of producing 1 a highly carbonaceous fibre or a set of fibres 2, comprising the combination 100 of a structured precursor 10 comprising a hydrocellulose fibre or set of fibres, and an unstructured precursor 15 comprising lignin or a lignin derivative in the form of a solution having a viscosity lower than 15,000 $mPa \cdot s^{-1}$ at the temperature at which the combination step 100 takes place.

This combination step 100 makes it possible to obtain a hydrocellulose fibre or set of fibres covered with the lignin or lignin derivative 20.

This process is shown schematically in FIG. 1. It may be carried out continuously or discontinuously. In the context of continuous production, the industrial methods allow the chaining of the various steps without interruption, whether from a fibre or even a set of fibres.

Structured Precursor (10)

The structured precursor 10 comprises a hydrocellulose fibre or set of fibres. This hydrocellulose fibre or this set of fibres may take very different forms. One of the advantages of the invention is that the process may be implemented on hydrocellulose fibres having been previously shaped, for example in the form of a twisted multi-filament, a non-twisted multi-filament, a set of nonwoven fibres, or a set of woven fibres.

In the production of carbon fibre fabrics, it is usually necessary to produce carbon fibre coils, for example from PAN, and then to organize these fibres according to the desired weavings. Here, the invention makes it possible to use directly hydrocellulose fibres that have been previously organized, in the form of a multi-filament or set of fibres. The process according to the invention then makes it possible, in particular by virtue of the lignin or lignin derivative deposition step on the hydrocellulose fibres, and after a carbonization and possibly graphitization step, to create multi-filaments or sets of fibres, such as a fabric, of carbon fibre having reduced density and advantageous mechanical properties for, in particular, the production of composite materials for the automotive or aerospace industries.

Thus, preferably, the structured precursor 10 comprises a twisted multi-filament, a non-twisted multi-filament, a set of non-woven fibres, or a set of woven fibres. Even more preferably, the structured precursor 10 may be a twisted multi-filament, a non-twisted multi-filament, a set of non-woven fibres, or a set of woven fibres.

The twisted multi-filaments that may be used according to the invention have, for example, a number of turns per meter between 5 and 2000 turns per meter, preferably between 10 and 1000 turns per meter.

The structured precursor 10 according to the invention may comprise at least one hydrocellulose fibre the diameter of which is between 0.5 µm and 300 µm, preferably between 1 µm and 50 µm. In addition, the structured precursor 10 according to the invention preferably comprises at least one continuous hydrocellulose fibre having a regular diameter over its entire length, and in particular the absence of fibril. This improves the cohesion between the lignin deposit and the fibre. By regular diameter, it should be understood that the diameter varies by less than 20%, preferably less than 10%, over the length of the fibre.

This hydrocellulose fibre may be obtained by various known production processes. It may, for example, be obtained according to the production process described in application WO2014064373. The hydrocellulose fibres used may also be lyocell or viscose fibres, the cellulose of which comes, for example, from wood or bamboo.

Most of the hydrocellulose fibre production processes are based on the production of a cellulose preparation from dissolved cellulose, for example carbon disulphide, 4-methylmorpholine 4-oxide (N-methylmorpholine-N-oxide-NMMO) or in an acid solution (for example orthophosphoric acid or acetic acid), which is then used to form the hydrocellulose continuous fibres after immersion in a coagulation bath containing, for example, sulphuric acid. The hydrocellulose fibre used in the process of the present invention as a precursor has not been previously carbonized.

Unstructured Precursor (15)

The unstructured precursor 15 comprises lignin or a lignin derivative. Lignin represents 10 to 25% of the terrestrial biomass of lignocellulosic nature and it is currently little exploited by industry. Thus, each year, several hundred tons of lignin or lignin derivatives are produced without any possible use. Lignin is present mainly in vascular plants (or higher plants) and in some algae. It is a plant aromatic polymer whose composition varies with the plant species and is generally formed from three phenylpropanoid monomers: p-coumaryl, sinapyl and coniferyl alcohol as illustrated by the formulas below:

p-coumaryl alcohol    sinapyl alcohol conifery alcohol

Preferably, the unstructured precursor 15 comprises between 1 and 50% by weight of lignin or of a lignin derivative. Advantageously, the unstructured precursor 15 comprises between 5% and 15% by weight of lignin or a lignin derivative. At this concentration, the deposit of lignin or lignin derivative is homogeneous, while allowing an increase in the carbon yield of the carbon fibre obtained after the carbonization step 300.

In addition, the unstructured precursor 15 is in the form of a solution having a viscosity of less than 15,000 mPa·s$^{-1}$ and preferably less than 10,000 mPa·s$^{-1}$, at the temperature at which the combination stage 100 takes place. With such a viscosity, the deposition of lignin or of lignin derivative is more homogeneous and makes it possible to obtain a continuous carbon fibre having a regular diameter while allowing an increase in the carbon yield of the carbon fibre obtained after the carbonization step 300. By regular diameter, it should be understood that the carbon fibre preferably has a diameter not varying by more than 20%, preferably by more than 10%, over its length.

The viscosity of the solution is measured at the temperature at which the combination step 100 takes place, for example by means of a free-flowing viscometer, or capillary viscosity, or the Brookfield method.

In particular, the unstructured precursor 15 used in the production method 1 is an aqueous solution, or an organic solution or a mixture of both. The use of an unstructured precursor 15 in the form of a solution makes it possible to control the deposit and its thickness. Moreover, the composition of the solution may be chosen according to the characteristics of the lignin or lignin derivative used. Preferably, the unstructured precursor 15 used in the production method 1 is a solution comprising water and an organic solvent such as an alcohol.

Advantageously, the structured precursor 10 and/or the unstructured precursor 15 may comprise carbon nanotubes, wherein the carbon nanotubes are present at a concentration of between 0.0001% and 10% by weight. Preferably, these carbon nanotubes are present at a concentration of between 0.01% and 1% by weight.

The carbon nanotubes (CNT) may be of the single wall, double wall or multiple wall type. The double-walled nanotubes may, in particular, be prepared as described by FLAHAUT et al. in Chem. Com. (2003), 1442. The multi-walled nanotubes may themselves be prepared as described in WO 03/02456. The nanotubes usually have an average diameter ranging from 0.1 to 100 nm, preferably from 0.4 to 50 nm and better still from 1 to 30 nm, even from 10 to 15 nm, and advantageously a length of 0.1. to 10 µm. Their length/diameter ratio is preferably greater than 10 and most often greater than 100. Their specific surface area is, for example, between 100 and 300 $m^2/g$, advantageously between 200 and 300 $m^2/g$, and their apparent density may be, in particular, between 0.05 and 0.5 $g/cm^3$ and more preferably between 0.1 and 0.2 $g/cm^3$. The multiwall nanotubes may, for example, comprise from 5 to 15 sheets (or walls) and more preferably from 7 to 10 sheets.

An example of crude carbon nanotubes is, in particular, commercially available from the ARKEMA company under the trade name Graphistrength® C100. Alternatively, these nanotubes may be purified and/or treated (for example oxidized) and/or milled and/or functionalized before being used in the method according to the invention. The purification of the crude or milled nanotubes may be carried out by washing with a sulphuric acid solution in order to rid them of any residual mineral and metal impurities. The oxidation of the nanotubes is advantageously carried out by contacting them with a solution of sodium hypochlorite. The functionalization of the nanotubes may be carried out by grafting reactive units such as vinyl monomers onto the surface of the nanotubes.

Combination (100)

The combination step 100 according to the invention corresponds to the contacting of the structured precursor 10 with the unstructured precursor 15. This combination may be carried out by several alternative methods, generally at a temperature ranging from −10° C. to 80° C., preferably from 20° C. to 60° C. For example, it is possible to carry out soaking, spraying or impregnation (for example by sizing). Preferably, the combination step 100 is by impregnation.

Thermal and Dimensional Stabilization (200)

The production method 1 according to the invention further comprises a step of thermal and dimensional stabilization 200 of the hydrocellulose fibre or set of fibres covered with the lignin 20 in order to obtain a hydrocellulose fibre or set of fibres coated with a lignin deposit 30.

The thermal and dimensional stabilization step 200 may comprise drying to allow the evaporation of the solvent and/or ventilation. The drying may be carried out through a rise in temperature, for example between 50° C. and 200° C. In fact, when the structured precursor is treated with an unstructured precursor comprising a diluent or organic solvent, it is desirable to remove the diluent or solvent subsequently, and, for example, to subject this article to heat treatment to expel the diluent or the solvent in the form of steam.

Following this step, a solid film of lignin or lignin derivative is formed on the surface of the fibre. This film may have varying thicknesses depending on the parameters used in the method such as the viscosity of the solution or the concentration of lignin or lignin derivative.

Preferably, the combination step 100 and thermal and dimensional stabilization step 200 may be repeated one or more times. The repetition of these steps makes it possible to increase the amount of lignin or lignin derivative deposited on the hydrocellulose fibre or set of fibres.

Carbonization (300)

The production process 1 according to the invention further comprises a step of carbonization 300 of the hydrocellulose fibre or set of fibres covered with a lignin deposit 30 in order to obtain a highly carbonaceous fibre or a set of highly carbonaceous fibre 2.

This carbonization step 300 may be carried out at a temperature of between 250° C. and 1000° C., preferably greater than 300° C., and preferably less than 600° C. The carbonization step 300 may, for example, last 2 to 60 minutes. This carbonization step may comprise a gradual rise in temperature. The carbonization takes place in the absence of oxygen, and preferably under a nitrogen atmosphere. The presence of oxygen during carbonization should preferably be limited to 5 ppm.

In general and as shown in the examples, the inventors have shown that the process according to the invention allows, with equivalent mechanical properties, the use of a lower temperature than the methods of the prior art. There is therefore a reduction in the amount of energy required to produce these carbon fibres, which represents energy savings.

This carbonization step may be carried out continuously and may be coupled to a drawing step of the carbon fibre in order to improve the mechanical properties of the carbon fibre obtained.

Pre-Carbonization Setting (210)

The production process according to the invention may further comprise, before the carbonization step 300, the following steps:
 a sizing step 210 consisting in bringing the hydrocellulose fibre or set of fibres into contact with an aqueous solution comprising at least one flame retardant compound, wherein the flame retardant compound may be selected from: potassium, sodium, phosphate, acetate, chloride, and urea, and
 a post-sizing drying step 220.

The sizing step 210 and post-sizing drying step 220 may be repeated one or more times.

Graphitization (400)

The production method according to the invention may further comprise, after the carbonization step 300, a graphitization step 400. This graphitization step 400 may be carried out at a temperature of between 1000° C. and 2800° C., preferably greater than or equal to 1100° C., and preferably less than 2000° C. The graphitization step 400 may, for example, last from 2 to 60 minutes, preferably from 2 to 20 minutes. This graphitization step 400 may comprise a gradual rise in temperature.

Post-Carbonization (500)

The production method according to the invention may further comprise, after the carbonization step 300, a sizing step 500 to contact the highly carbonaceous fibre or set of fibres 2 with a solution of an organic component which may comprise at least one silane or silane derivative and/or at least one siloxane or siloxane derivative. This sizing 500 may also be performed after the graphitization step 400. It improves the integrity of the fibre and protects it from abrasion.

The solution comprising at least one silane or silane derivative and/or at least one siloxane or siloxane derivative is preferably an aqueous solution, an organic solution or an aqueous emulsion.

In another aspect, the invention relates to a hydrocellulose fibre or set of fibres coated with a lignin deposit 30 as an intermediate product obtained after the thermal and dimensional stabilization step 200 of the production process according to the invention.

This intermediate product has a ratio of the weight of fibre to the weight of lignin or lignin derivative of between 1/2 and 100/1, preferably between 2/1 and 95/1.

In addition, the lignin deposit of this intermediate product comprises between 0.50% and 50% by weight of flame retardant compound, preferably between 2% and 30% by weight.

In another aspect, the invention relates to a highly carbonaceous fibre or set of fibres 2 obtainable by the method according to the invention. Preferably and advantageously, the highly carbonaceous fibre or set of fibres 2 have, after the carbonization step 300, a density of between 0.20 and 1.95 g/cm³, preferably between 1.45 and 1.80 g/cm³. Preferably, the invention relates to a highly carbonaceous fibre or set of fibres 2 obtained from the combination of a structured precursor 10 and an unstructured precursor 15, wherein the structured precursor 10 comprises a hydrocellulose fibre or set of fibres, wherein the unstructured precursor 15 comprises lignin or a lignin derivative and the fibre or set of fibres has, after the carbonization step 300, a density of between 0.20 and 1.95 g/cm³, preferably between 1.45 and 1.60 g/cm³.

More preferably, the highly carbonaceous fibre or set of fibres 2 that may be obtained by the method according to the invention have a density of between 1.45 and 1.60. g/cm³ after the carbonization step 300.

According to another aspect, the invention relates to the use a highly carbonaceous fibre or set of fibres that may be obtained with the production method according to the invention for the production of parts made of thermoplastic or thermosetting composite materials.

In another aspect, the invention relates to thermoplastic or thermosetting composite materials obtained from the fibres produced via the production method according to the invention. Advantageously, these thermoplastic or thermosetting composite materials have, for an identical volume, a weight less than 5% by weight compared with conventional thermoplastic or thermosetting composite materials.

The following example illustrate the invention, but have no limiting character.

Description of the Starting Materials:

The structured precursor used is based on hydrocellulose fibres (Rayon) marketed by the Cordenka company.

For the formation of the unstructured precursor, the lignin was solubilized in a 60/40 ethanol/water mixture at 60° C. After 2 hours of stirring, the solution was cooled to ambient temperature. The precipitated fraction was filtered. The final solution contained 10% by weight of lignin.

Preparation of Carbon Fibres

Step 1: Impregnation

The hydrocellulose fibres, the structured precursor, are impregnated with the unstructured precursor by being continuously passed through the lignin solution at a speed of 15 m/min.

Step 2: Drying

The lignin impregnated fibres were continuously dried by passing through ovens at 140° C. with a residence time of about two minutes.

Step 3: Sizing

The fibres comprising a lignin deposit were sized in an aqueous base flame retardant formulation comprising 160 g/dm³ of $NH_3Cl$ and 20 g/dm³ of Urea.

Step 4: Post-Sizing Drying

The fibres covered with a lignin deposit after sizing were subjected to a drying step under the same conditions as step 2.

Step 5: Carbonization

The carbonization was carried out continuously under a nitrogen atmosphere at an average temperature of 350° C. for an average duration of 16 minutes.

Step 6: Graphitization

The graphitization was carried out at an average temperature of 1100° C. under a nitrogen atmosphere, for an average duration of 16 minutes.

Characteristics of Carbon Fibres Obtained

Regular Deposition

The lignin deposition on the hydrocellulose fibre was 6-7% by weight. Quantification of the mass lignin deposition may be obtained by weighing the hydrocellulose fibre before step 1 and then after step 2 of the drying.

Figure 2A:
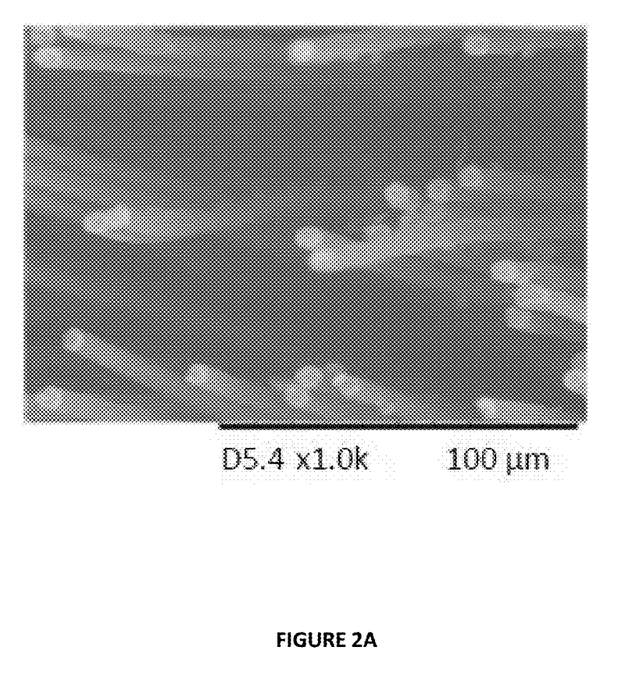
FIGS. 2A and 2B shows an image obtained by scanning electron microscopy of a section of carbon fibres according to the invention.
Figure 2B:
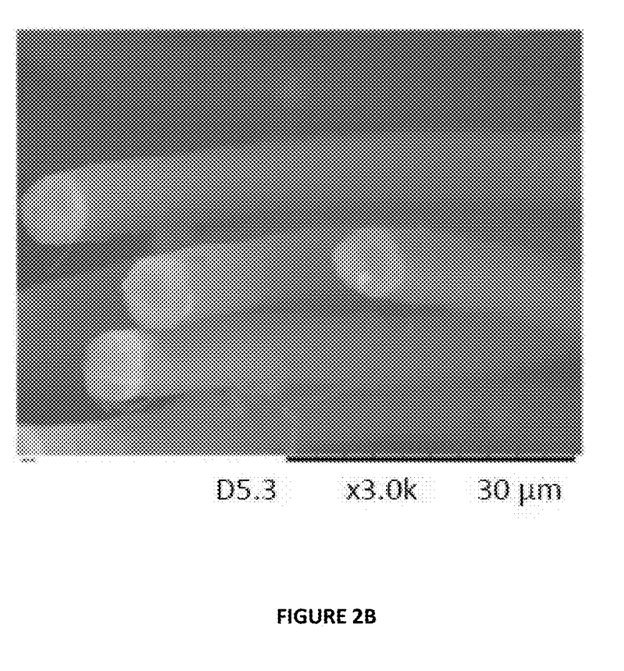

FIGS. 2A and 2B shows an image obtained by scanning electron microscopy of a section of the carbon fibres obtained by the process according to the invention. This image shows that the carbon fibres are distinct without agglomerate creation, and that the interface between the carbon fibre coming from the hydrocellulose fibre and the lignin after graphitization is not visible.

These carbon fibres have a diameter of between 6 and 7 μm which is larger than that of the hydrocellulose fibres used as the structured precursor for the production of these carbon fibres.

Increased Carbon Yield

The carbon yield (CY) was calculated after the carbonization:

$$CY = (\text{carbonaceous material per } m / \text{precursor per } m) \times 100$$

The carbonization results are as follows:

Hydrocellulose fibres, no lignin deposition, carbonized (reference) 22%

Hydrocellulose fibres, with 7% lignin deposition, carbonized (according to the invention) 30%

Thus, the combination of hydrocellulose fibres with lignin in order to form, before carbonization, hydrocellulose fibres coated with a lignin deposit makes it possible to go from 22% to 30% of carbon yield, i.e. an increase of more than 36%.

In addition, the addition of carbon nanotubes in the unstructured precursor containing the lignin makes it possible to increase the carbon yield further and to reach carbon yields of 35%, i.e. an overall increase of nearly 60% of the carbon yield.

Optimization of Method Parameters

The temperature conditions were adjusted to obtain the same mechanical properties of the fibres coming from hydrocellulose fibres without lignin deposition (reference), and from hydrocellulose fibres having undergone the method according to the invention:

Stress at break: 500-600 MPa,

Elongation: 4-5%, and

Fibre shrinkage/elongation, set at 0% (no shrinkage, no stretching).

These fibres have a higher elongation at break than conventional carbon fibres.

The average temperature results of these tests are presented in the table below:

|  | T° C. average drying | T° C. average carbonization | T° C. average graphitization |
|---|---|---|---|
| Hydrocellulose fibre without lignin deposit (reference) | 180 | 750 | 2100 |
| Hydrocellulose fibre with lignin deposit (according to the invention) | 140 | 350 | 1100 |

These results show that the process according to the invention makes it possible to reduce the temperature necessary for three of the conventional steps in the production of carbon fibres. This reduction in temperature varies between 20 and 55% depending on the steps. It corresponds more generally to a reduction in the energy required to transform the fibres into carbon fibres. Such energy savings may be translated into industrial terms by a reduction of the costs of producing carbon fibres.

These examples show that the treatment of precursor hydrocellulose by lignin makes it possible to increase the carbon yield and to reduce the temperature of the high temperature furnaces for the production of fibres of the same quality.

Thus, the present invention includes the use of a natural resource, cellulose, at the base of a structured precursor combined with another natural resource, lignin as an unstructured precursor to obtain a carbon fibre or a lighter carbon fibre set, that is more efficient for the carbon yield and gives a lower cost carbonized material than precursors such as PAN fibres.

The carbon fibres obtained by the method of the invention may advantageously be used as a replacement for conventional glass fibre or carbon fibre for the production of parts made of thermoplastic or thermosetting composite materials that may be used, in particular, in the sectors of aerospace, automotive, wind energy, naval, building construction, and sports. These fibres according to the invention have several advantages, in particular a reduction in the weight of the structures because the fibres according to the invention have a lower density than conventional glass fibres and carbon fibres.

The invention claimed is:

1. A hydrocellulose fibre or set of fibres coated with a lignin deposit or a lignin derivative, wherein the coated hydrocellulose or set of fibres are formed from a combination of a structured precursor comprising a hydrocellulose fibre or set of fibres, and an unstructured precursor comprising a lignin deposit or a lignin derivative at a temperature between −10° C. to 80° C.,
wherein the unstructured precursor is in the form of a solution having a viscosity of less than 15,000 mPa·s$^{-1}$ [[at a temperature between −10° C. to 80° C.]]; and
wherein the combination is further reacted in a thermal and dimensional stabilization to form the coated hydrocellulose fibre or set of fibres,
wherein the coated hydrocellulose fibre or set of fibres possess a weight ratio of fibre to lignin deposit or lignin derivative between 1/2 and 100/1.

2. The coated hydrocellulose fibre or set of fibres according to claim 1, wherein the lignin deposit or lignin derivative further comprises between 0.50% and 50% by weight of flame retardant compound.

3. A highly carbonaceous fibre or set of fibres obtained by a process comprising:
reacting the coated hydrocellulose fibre or set of fibres of claim 1 in a carbonization step, wherein the highly carbonaceous fibre or set of fibres possess a density between 0.20 g/cm$^3$ and 1.95 g/cm$^3$.

4. The highly carbonaceous fibre or set of fibres according to claim 3, wherein highly carbonaceous fibre or set of fibres possess a density between 1.45 g/cm$^3$ and 1.60 g/cm$^3$.

5. A part made of thermoplastic or thermosetting composite materials, wherein the part comprises the highly carbonaceous fibre or set of fibres according to claim 3.

6. The coated hydrocellulose fibre or set of fibres according to claim 1, wherein the lignin deposit or lignin derivative comprises between 2% and 30% by weight of flame retardant compound.

7. The coated hydrocellulose fibre or set of fibres according to claim 1, wherein the structured precursor comprises a twisted multi-filament, non-twisted multi-filament, a set of non-woven fibres, or a set of woven fibres.

8. The coated hydrocellulose fibre or set of fibres according to claim 1, wherein the unstructured precursor comprises between 1 and 50% by weight of lignin or lignin derivative.

9. The coated hydrocellulose fibre or set of fibres according to claim 1, wherein the unstructured precursor is an aqueous solution, an organic solution, or a mixture of both.

10. The coated hydrocellulose fibre or set of fibres according to claim 1, wherein the structured precursor comprises at least one hydrocellulose fibre with a diameter between 0.5 μm and 300 μm.

11. The coated hydrocellulose fibre or set of fibres according to claim 1, wherein the structured precursor and/or the unstructured precursor comprises carbon nanotubes, wherein the carbon nanotubes are present at a concentration of between 0.0001% and 10% by weight.

12. The coated hydrocellulose fibre or set of fibres according to claim 1, wherein the combination of the structured and un-structured precursors further comprises an impregnation.

13. The coated hydrocellulose fibre or set of fibres according to claim 1, wherein the thermal and dimensional stabilization step is repeated one or more times.

14. The highly carbonaceous fibre or set of fibres according to claim 3, wherein before the carbonization step, a sizing step of contacting the coated hydrocellulose fibre or set of fibres with an aqueous solution comprising at least one flame retardant compound occurs; and wherein a post-sizing drying step occurs after the sizing step.

15. The highly carbonaceous fibre or set of fibres according to claim 14, wherein the sizing step and post-sizing drying step are repeated one or more times.

16. The highly carbonaceous fibre or set of fibres according to claim 3, wherein a graphitization step occurs after the carbonization step.

17. The highly carbonaceous fibre or set of fibres according to claim 3, wherein after the carbonization step, a sizing step comprising contacting the highly carbonaceous fibre or set of fibres with a solution comprising at least one organic component occurs, wherein the solution comprises at least one silane or silane derivative and/or at least one siloxane or siloxane derivative.

* * * * *